(12) United States Patent  (10) Patent No.: US 8,192,164 B2
Herrmann  (45) Date of Patent: Jun. 5, 2012

(54) TURBINE RUNNER WITH REDUCED LEAKAGE OF SERVO-OIL

(75) Inventor: Carsten D. Herrmann, Weingarten (DE)

(73) Assignee: VA Tech Hydro GmbH, Vienna (AT)

( * ) Notice: Subject to any disclaimer, the term of this patent is extended or adjusted under 35 U.S.C. 154(b) by 1268 days.

(21) Appl. No.: 11/630,911

(22) PCT Filed: Jun. 6, 2005

(86) PCT No.: PCT/EP2005/052580
§ 371 (c)(1),
(2), (4) Date: Dec. 27, 2006

(87) PCT Pub. No.: WO2006/000519
PCT Pub. Date: Jan. 5, 2006

(65) Prior Publication Data
US 2008/0095617 A1   Apr. 24, 2008

(30) Foreign Application Priority Data
Jun. 29, 2004   (AT) ................ A 1102/2004

(51) Int. Cl.
*F03B 3/14*   (2006.01)
(52) U.S. Cl. .................................. 416/157 R

(58) Field of Classification Search ......... 416/147, 416/155, 156, 157 R; 60/455
See application file for complete search history.

(56) References Cited

U.S. PATENT DOCUMENTS 2,357,228 A * 8/1944 Seewer ............ 416/157 R
2,636,714 A * 4/1953 Willi ................. 416/146 R
3,778,187 A * 12/1973 Wennberg ............. 416/95

FOREIGN PATENT DOCUMENTS
JP          59087279 A * 5/1984
* cited by examiner

*Primary Examiner* — Edward Look
*Assistant Examiner* — Ryan Ellis
(74) *Attorney, Agent, or Firm* — Alix, Yale & Ristas, LLP

(57) ABSTRACT

Due to increasing environmental requirements, oil must be prevented from leaking from a turbine rotor disk and reaching the medium circulating around the turbine. In Kaplan turbines comprising a hydraulic mechanism (6) for actuating the rotor disk blades (3), hydraulic liquid leaks from the servomotor (5) and is collected in the inner chamber of the rotor disk hub (2). The invention relates to a rotor disk (1) by which means said leakage liquid can be reliably and easily collected and guided out of the rotor disk (1). A collecting basin (8) is arranged-around the free end of the piston rod (7). The actuating movement of the servomotor (5) reduces and enlarges the pump volume (17), and hydraulic liquid is thus guided from the collecting basin (8) into the delivery pipe (11).

20 Claims, 4 Drawing Sheets

TURBINE RUNNER WITH REDUCED LEAKAGE OF SERVO-OIL

BACKGROUND

The subject invention concerns a turbine runner of the Kaplan type with adjustable runner blades, where the runner blades are adjustable by an oil-operated servo-motor, which is mounted on a piston rod in the runner hub.

Oil-operated servomotors are often used in Kaplan turbines for the purpose of adjusting the runner blades. Leakage losses of the servo-oil from the servomotor may occur. Due to the increasing environmental requirements, the leakage losses of the servo-oil must be prevented from being transported to the medium flowing around the turbine.

Therefore, the subject invention is based on the task of defining a turbine runner with which the leakage from the servomotor can be prevented, in a simple and effective manner, from being transported into the medium flowing around the turbine.

According to the invention, this task is solved by a collecting bin being provided in which the oil emerging between the piston rod and a seal of the servomotor is collected, the collecting bin being arranged around the free end of the piston rod and rigidly connected with the servomotor and moving with the latter, a delivery pipe being provided and one end of the delivery pipe discharging into a pump room formed between the movable collecting bin and the fixed piston rod and the actuation movement of the servomotor reducing and increasing the pump room and thus hydraulic liquid being conveyed from the collecting bin into the delivery pipe.

In this manner, the power for conveying the leakage from the runner comes from the servomotor during the adjustment movement of the runner blades, and, therefore, no separate driving mechanism is needed for the leakage conveyance system. The movement of the servomotor, which is in any case needed to control the turbine, is therefore used for conveying the leakage as well. In addition, the leakage conveying system is of simple design and needs but a few items and requires only minor adaptations to the runner.

It is especially easy to prevent backflow of the leakage into the collecting bin by providing a valve in the delivery pipe.

A particularly advantageous embodiment is achieved with an intermediate storage for the conveyed oil, which is accommodated in the turbine runner, wherein the intermediate storage is advantageously arranged between the piston rod, the runner hub and a turbine shaft to which the turbine runner is mounted.

To enable ease of conveyance of the leakage from the intermediate bin, a second delivery pipe, which is preferably arranged in the turbine shaft, is provided, the end of which is connected to the intermediate bin.

Backflow of the leakage from the intermediate storage to the collecting bin can be prevented easily by the discharge of the first delivery pipe being arranged in the intermediate storage such that the level of the leakage is below the discharge of the first delivery line.

BRIEF DESCRIPTION

The present invention will now be described using FIGS. 1 to 3 as non-limiting examples, where:

DETAILED DESCRIPTION OF THE DRAWINGS

Figure 1:
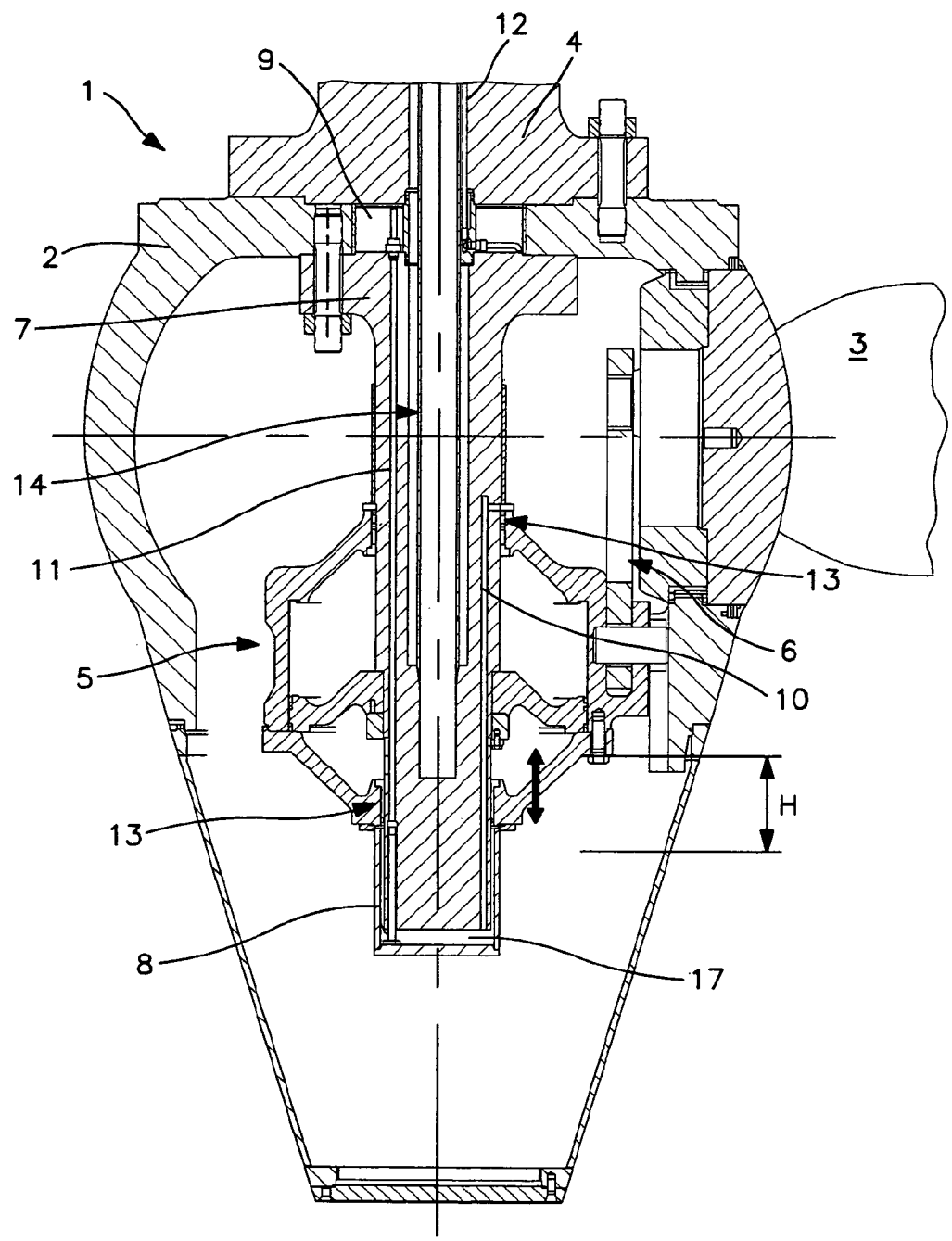
FIG. 1 shows a section through an example of an embodiment of a runner according to the invention, FIG. 2 a detailed presentation of a first leakage conveyance stage, and FIG. 3 a detailed presentation of a second leakage conveyance stage.

FIG. 1 shows the runner 1 of a Kaplan turbine, consisting of a runner hub 2, which is mounted to a turbine shaft 4. A number of runner blades 3 are mounted to the runner hub 2, the runner blades 3 being adjustable via an hydraulic servomotor 5 and an actuation mechanism 6. These runners 1 are very well known and need not be described here in detail.

The servomotor 5 is arranged at a piston rod 7, which is fixed to the runner hub 2 at one end, and glides up and down along the rod, as indicated by the double arrow in FIG. 1. To do so, the servomotor 5 is supplied with pressurized hydraulic liquid, normally oil, via the feed pipes 14 and thus moved along the piston rod 7. Such a servomotor 5 is also well known and detailed description is renounced.

Seals 13, which are to prevent hydraulic liquid from emerging from the servomotor 5 to the inner room of the runner hub 2 and further from runner hub 2 to the medium flowing around the turbine, are arranged between the servomotor 5 and the piston rod 7. However, leakage losses from seals 13 necessarily occur at times, because it is not possible to achieve an absolutely tight finish of the seals 13 and the sealing performance of the seals 13 may also deteriorate due to wear and external influences. These leakage losses must be collected due to the aforementioned reasons and must be eliminated from the runner hub 2. To do so, conveyance of the leakage is applied according to the invention and as described in the following, using FIGS. 1 to 3.

An externally closed collecting bin 8, which is rigidly connected to the servomotor 5, is arranged around the free end of piston rod 7. Consequently, collecting bin 8 is moved together with the servomotor. Collecting bin 8 is sized and arranged such that it encloses seals 13 on the side of the servomotor 5, which is connected to collecting bin 8. Any leakage losses from this seal 13 are thus directly led to collecting bin 8 and are collected there, as shown by the arrow in FIG. 2. Any leakage losses of seal 13 on the other side of the servomotor 5 are collected by a suitable device, i.e. a ring on the piston rod 7, and led to collecting bin 8 via a pipe 10, as also shown by an arrow. Here, pipe 10 is arranged in the piston rod 7, but it could be designed in other ways. This ensures that all hydraulic liquid leakage losses are collected in collecting bin 8 and cannot be transported to the inner room of the runner hub 2.

Figure 2:
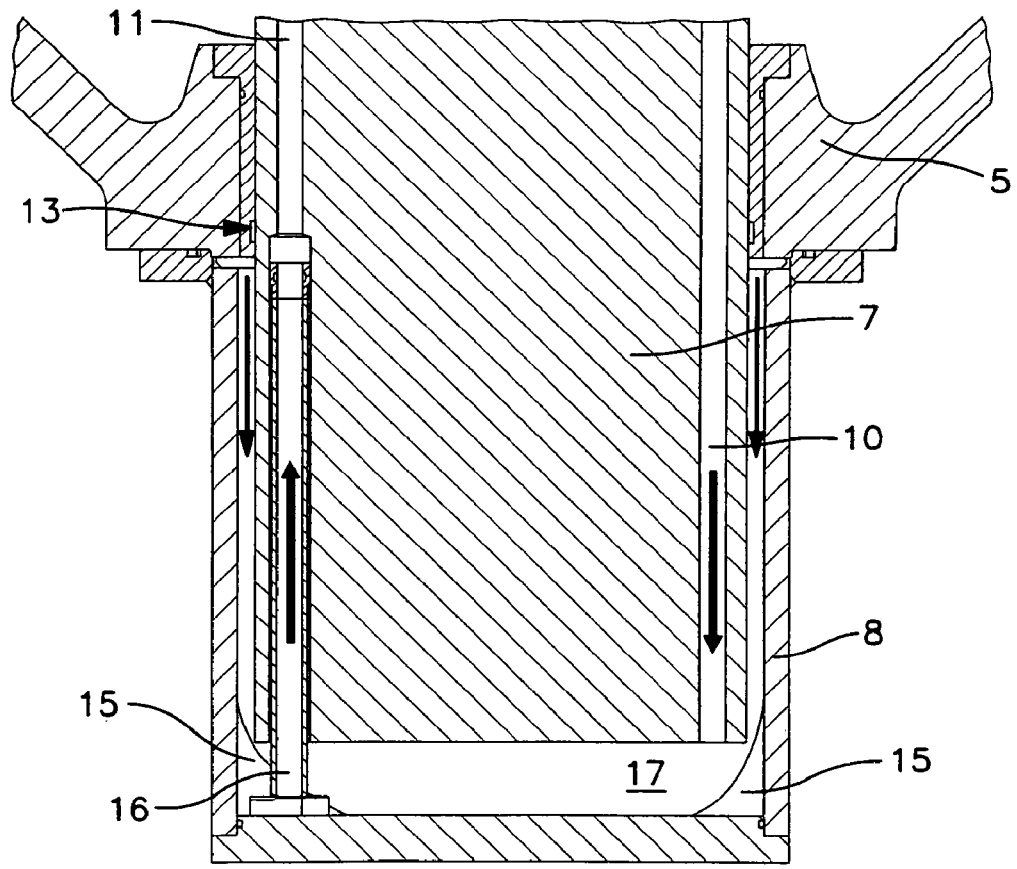

As shown in FIG. 2, the leakage 15 collects in the corners and at the outer walls of collecting bin 8 due to the centrifugal forces acting on account of the rotation of runner 1. In order to remove it from there, a connection piece 16 is arranged the discharge of which is located in the area of the corner of collecting bin 8, in which the leakage 15 collects. This connection piece 16 is connected to a first delivery pipe 11, with which the leakage 15 can be discharged from the collecting bin 8. In this case, the delivery pipe 11 is arranged in the piston rod 7, but it could be designed and arranged in any other manner.

Due to the actuation movement of servomotor 5, which also entrains the collecting bin 8, a change occurs in the volume enclosed between the fixed piston rod 7 and the moved collecting bin 8, which volume is termed pumping volume 17 here. The movement range of servomotor 5 and, therefore, of the collecting bin 8 is indicated as "H" in FIG. 1. As the pump volume decreases, leakage 15 is thus conveyed to connection piece 16 and further on to the first delivery pipe 11. Connecting piece 16 is designed such that it can follow the movement of collecting bin 8. The example in FIG. 2 shows the connecting piece 16 designed as a pipe, which glides in a hole connected to the first delivery pipe 11. It goes without saying that the connecting piece 16 can have a different design, e.g. as a telescopic pipe, flexible hose or spiral hose.

Figure 4:
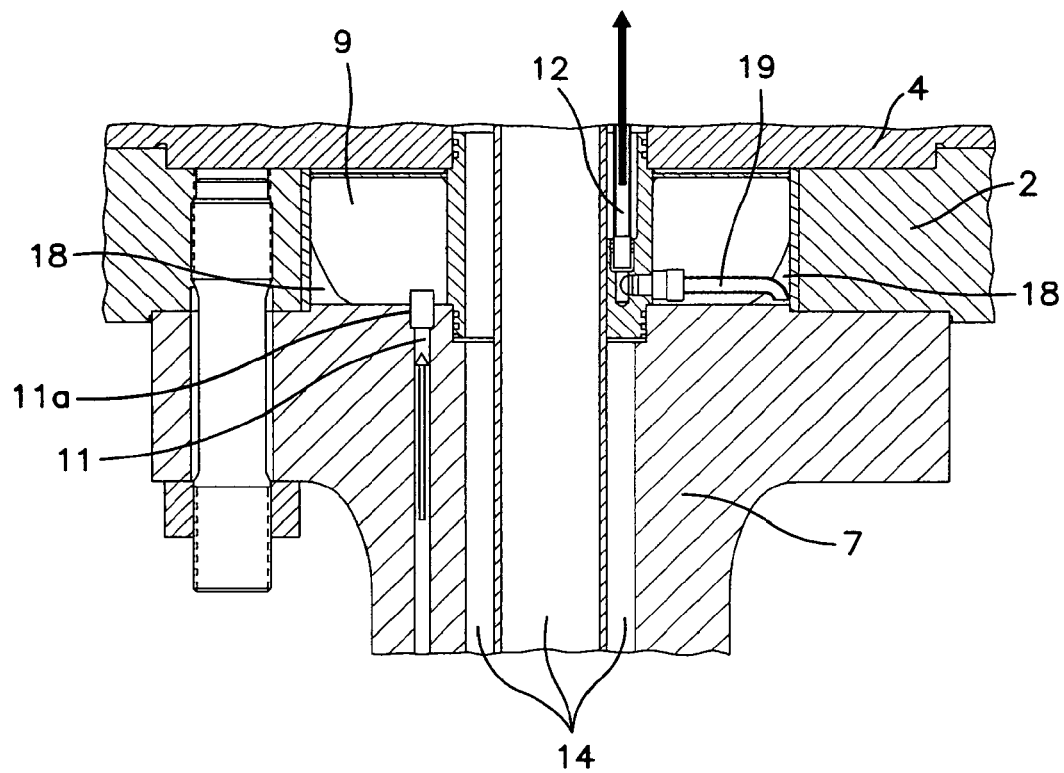
FIG. 4 shows an alternative embodiment of the second leakage conveyance stage illustrated in FIG. 3.

Leakage 15 could be removed from the runner hub 2 to, for instance, a collecting bin (not shown), through the first delivery pipe 11. To prevent leakage 15 from being sucked back to the collecting bin 8 at the opposite actuation movement of servomotor 5, i.e., when the pump volume 17 increases, a check valve could be provided e.g. in the delivery pipe 11. Such an alternative embodiment is shown at 11a in FIG. 4. With a further valve between pump volume 17 and the inner room, which is filled with air, of runner hub 2, pressure compensation could be also prevented by the development of too high an underpressure in pump room 17.

Due to the pump movement of collecting bin 8, which is caused by the actuating movement of servomotor 5, the leakage 15 can thus be removed easily from the collecting bin 8 and without any other driving device.

Figure 3:
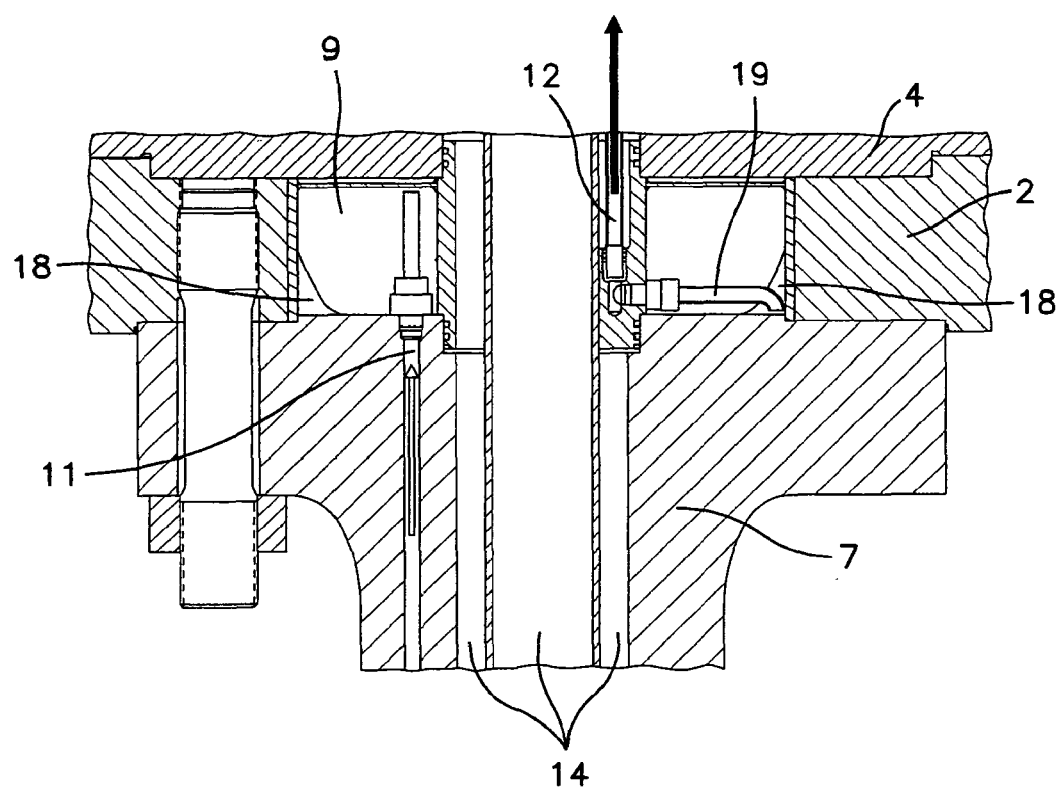

FIGS. 1 and 3 show a particularly favourable embodiment of how the leakage 15 could be removed from the collecting bin 8 and the runner hub 2.

The first delivery pipe 11 discharges into an intermediate storage 9 arranged between the turbine shaft 4, runner hub 2 and piston rod 7, where the leakage 18 conveyed from collecting bin 8, indicated by the arrow, collects again in the corner and at the outer walls of collecting bin 8 due to the centrifugal forces occurring. Through a further connecting piece 19, which is again arranged to discharge into the area of the corner of the intermediate storage 9, leakage 18 is transported to a second delivery pipe 12 on account of the pump movement of the collecting bin 8. Here, this second delivery pipe 12 leads the leakage 18 out of runner hub 2 through the turbine shaft 4, indicated by the arrow, e.g. into a supply bin for hydraulic liquid (not shown).

To prevent back suction of leakage 18 from the intermediate storage 9, the first delivery pipe 11 is extended to just below the upper edge of intermediate storage 9. Leakage 18 could, therefore, flow back into the first delivery pipe 11 only if intermediate storage 9 is almost full. The same effect could again be achieved by a check valve mounted in the first delivery pipe 11 or the second delivery pipe 12.

Due to the temporary suction caused by the actuation movement of servomotor 5, leakage 18 is also sucked from the second delivery pipe 12 back to intermediate storage 9. This storage should, therefore, be sized at least such that the entire volume of the second delivery pipe 12 can be taken up, because then the back-suction of leakage 18 from intermediate storage 9 into delivery pipe 11 can be prevented by the extension of the first delivery pipe 11. But, similarly to the description above, a check valve could be provided in the second delivery pipe 12 in order to prevent the backflow of leakage 18.

The example of an embodiment according to FIG. 1 to FIG. 3, therefore, shows a multi-stage leakage conveying system that is structured especially simply and works effectively and safely all the same and which uses the power of the servomotor 5, which is available anyway during the actuation movement of the runner blades 3, for conveyance of the leakage. The leakage conveyance system could, however, just as well consist of a single stage only, as described in the foregoing.

FIG. 1 to FIG. 3 show a Kaplan turbine in a vertical arrangement. The leakage conveyance system described above also works with horizontal or slanted Kaplan turbines, e.g. in bulb turbines; in these cases, the connecting pieces 16, 19 and/or delivery pipes 11, 12, and/or intermediate storage 9 and/or other parts of the leakage conveyance system may be arranged differently.

The invention claimed is:

1. A turbine runner of the Kaplan type, with adjustable runner blades mounted to a runner hub which is mounted to a turbine shaft, where the runner blades are adjustable by a hydraulically operated servomotor, which is mounted on a piston rod in the runner hub, the improvement comprising a collecting bin being provided, in which hydraulic liquid emerging between the piston rod and a seal of the servomotor is collected, the collecting bin being arranged around the free end of the piston rod and being rigidly connected with the servomotor and moving with the latter, a delivery pipe being provided and one end of the delivery pipe discharging into a pump volume formed between a movable collecting bin and the fixed piston rod and the actuation movement of the servomotor reducing and increasing the pump volume and thus hydraulic liquid being conveyed from the collecting bin into the delivery pipe.

2. A turbine runner according to claim 1, the improvement further comprising a valve being provided in the delivery pipe with which a backflow of hydraulic liquid from the delivery pipe to the collecting bin can be prevented.

3. A turbine runner according to claim 2, the improvement further comprising an intermediate storage being provided in the turbine runner for the conveyed hydraulic liquid and the delivery pipe conveying liquid into the said intermediate storage.

4. A turbine runner according to claim 3, the improvement further comprising the intermediate storage being arranged between the piston rod, the runner hub and a turbine shaft to which the turbine runner is mounted.

5. A turbine runner according to claim 4, the improvement further comprising a second delivery pipe being provided and one end of the second delivery pipe being connected to the intermediate storage.

6. A turbine runner according to claim 5, the improvement further comprising the second delivery pipe being arranged in the turbine shaft.

7. A turbine runner according to claim 6, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

8. A turbine runner according to claim 3, the improvement further comprising a second delivery pipe being provided and one end of the second delivery pipe being connected to the intermediate storage.

9. A turbine runner according to claim 8, the improvement further comprising the second delivery pipe being arranged in the turbine shaft.

10. A turbine runner according to claim 9, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

11. A turbine runner according to claim 1, the improvement further comprising an intermediate storage being provided in the turbine runner for the conveyed hydraulic liquid and the delivery pipe conveying liquid into the said intermediate storage.

12. A turbine runner according to claim 11, the improvement further comprising the intermediate storage being arranged between the piston rod, the runner hub and a turbine shaft to which the turbine runner is mounted.

13. A turbine runner according to claim 12, the improvement further comprising a second delivery pipe being provided and one end of the second delivery pipe being connected to the intermediate storage.

14. A turbine runner according to claim 13, the improvement further comprising the second delivery pipe being arranged in the turbine shaft.

15. A turbine runner according to claim 12, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

16. A turbine runner according to claim 11, the improvement further comprising a second delivery pipe being provided and one end of the second delivery pipe being connected to the intermediate storage.

17. A turbine runner according to claim 16, the improvement further comprising the second delivery pipe being arranged in the turbine shaft.

18. A turbine runner according to claim 17, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

19. A turbine runner according to claim 16, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

20. A turbine runner according to claim 11, the improvement further comprising a discharge of the first delivery pipe being arranged in the intermediate storage such that a level of leakage of the hydraulic liquid from the servomotor is below the discharge of the first delivery pipe and thus backflow of the hydraulic liquid from the intermediate storage to the first delivery pipe is essentially being prevented.

\* \* \* \* \*